US010859112B1

(12) United States Patent
Stockton et al.

(10) Patent No.: US 10,859,112 B1
(45) Date of Patent: Dec. 8, 2020

(54) ANTI-FRICTION INSULATED BEARING SLEEVE CONSTRUCTION AND MODULARITY

(71) Applicant: ABB Schweiz AG, Baden (CH)

(72) Inventors: Christopher A. Stockton, Greenville, SC (US); Stephen Douglas Browne, Shelby, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/453,183

(22) Filed: Jun. 26, 2019

(51) Int. Cl.
*F16C 35/077* (2006.01)
*F16C 19/52* (2006.01)
*F16C 35/073* (2006.01)

(52) U.S. Cl.
CPC .......... *F16C 19/525* (2013.01); *F16C 35/073* (2013.01); *F16C 2380/26* (2013.01)

(58) Field of Classification Search
CPC .... F16C 19/525; F16C 35/077; F16C 41/004; F16C 2380/26; H02K 5/173; H02K 5/1732; H02K 5/1735; H02K 5/1737
See application file for complete search history.

(56) References Cited

U.S. PATENT DOCUMENTS

| | | | | |
|---|---|---|---|---|
| 2,283,839 A | * | 5/1942 | Wright | F16C 27/066 384/536 |
| 3,112,417 A | * | 11/1963 | Tamm | H02K 5/1732 310/90 |
| 5,735,615 A | * | 4/1998 | Pontzer | F16C 35/00 384/476 |
| 6,966,701 B2 | * | 11/2005 | Schelbert | F16C 35/077 384/476 |
| 8,387,258 B2 | | 3/2013 | Zhong et al. | |

FOREIGN PATENT DOCUMENTS

| | | | | |
|---|---|---|---|---|
| AT | 324485 B | | 9/1975 | |
| FR | 1325720 A | | 5/1963 | |
| JP | 55139049 A | * | 10/1980 | ........... H02K 5/1732 |
| JP | 59216439 A | * | 12/1984 | ........... H02K 5/1732 |
| WO | WO 02/09258 A1 | | 1/2002 | |

OTHER PUBLICATIONS

European Patent Office, International Search Report in International Patent Application No. PCT/IB2020/053996, 5 pp. (dated Jul. 6, 2020).
European Patent Office, Written Opinion in International Patent Application No. PCT/IB2020/053996, 6 pp. (dated Jul. 6, 2020).

* cited by examiner

*Primary Examiner* — Phillip A Johnson
(74) *Attorney, Agent, or Firm* — Leydig, Voit & Mayer, Ltd.

(57) ABSTRACT

An anti-friction insulated bearing system, including a bracket disposed about a motor driveshaft and a bearing disposed within the bracket configured to support the driveshaft for rotation. The system also includes an outer bearing cap disposed proximal a drive end of the bracket and an inner bearing cap. The system further includes an insulation sleeve disposed within the bracket proximal the bearing. The outer bearing cap, the inner bearing cap and the insulation sleeve are configured as modular components of the system. The modular insulation sleeve allows the use of standard anti-friction rolling element bearings. The modular components have common inner and outer bearing caps that can be used across a multitude of configurations with a minimal number of parts.

18 Claims, 23 Drawing Sheets

SECTION A-A

SECTION A-A

SECTION B-B

SECTION A-A

SECTION B-B

SECTION A-A

SECTION B-B

SECTION D-D

DETAIL C

ANTI-FRICTION INSULATED BEARING SLEEVE CONSTRUCTION AND MODULARITY

BACKGROUND OF THE INVENTION

Stock motors can be modified to meet specific requirements. Therefore, some components are stocked in order to expedite any requested modifications. Referring now to FIGS. 1 and 2, there is a flowchart 10 illustrating an end bracket assembly 12, where the drive end standard non-insulated bracket can be modified to be insulated, and alternate seals can be selected on both ends. Previous designs consist of a bracket 22 (non-insulated 14 or insulated 16), inner cap 30 and bearing 28. A seal 24 is mounted to the shaft 31 and located within a machined cavity on the bracket 22. The bracket cavity is machined differently for each seal. Five (5) or more seal options are needed. Bracket 22 has to be machined and stocked to accommodate a modification request by a user. In most conventional designs, two main problems exist with these two modifications: 1.) When a user or customer modifies a stock motor from a non-insulated bracket 14 to an insulated bracket 16, in each bracket 14, 16 the inner cap 30 is replaced with a different inner cap. As a result, the bearing is removed, which damages the bearing, and is subsequently scrapped. In addition to this, different brackets are used when the bearing is non-insulated or insulated. As shown in FIG. 1, there is a minimum of eight (8) brackets have to be stocked for each bearing size to accommodate this. In other words, four shaft seals (18b, 18c, 18d, 18e) multiplied by two insulation methods (14, 16) results in eight brackets (19b, 19c, 19d, 19e) per method (14, 16) which may be rather expensive; and 2.) A feature is machined in the bracket for the shaft seal (18a, 19a). Since the geometry of each seal is different from the other, for each bearing size, at least four (4) different brackets are stocked in order to meet the user's choice of shaft seal which can also be very expensive and cause long lead times to produce as a non-standard part. Bearing that have insulation on the outer diameter and side are costly to produce.

Typical electric machine bearings have a need to be insulated against circulating currents induced in the rotor. These currents, called shaft currents, pass through the machine's shaft and bearing and damage the bearings. Electric machines use hybrid ceramic element bearings, ceramic-coated bearings and composite sleeves to prevent these circulating currents. Ceramic bearings and composite sleeves are expensive and difficult to procure in a wide variety of sizes.

Referring now to FIG. 2, there is a conventional bearing insulation system 20 which includes a driveshaft 31, a bracket 22 disposed about the driveshaft 31, a seal 24 disposed within the bracket 22, an insulation sleeve 26 pressed into bracket 22, an insulated bearing 28 disposed in bracket 22, and an inner cap 30 isolated from a bearing 28 by an insulated spacer 32. This system 20 has all of the disadvantages and problems discussed above when modification are required by a user. Thus, there is a need to provide a less expensive and more readily available bearing insulation system as the present invention addresses herein.

BRIEF SUMMARY OF THE INVENTION

The invention provides an anti-friction insulated bearing system, including a bracket disposed about a motor driveshaft and a bearing disposed within the bracket configured to support the driveshaft for rotation. The system also includes an outer bearing cap disposed proximal a drive end of the bracket and an inner bearing cap. The system further includes an insulation sleeve disposed within the bracket proximal the bearing. The outer bearing cap, the inner bearing cap and the insulation sleeve are configured as modular components of the system.

The invention provides a motor bracket including a bearing disposed within the bracket configured to support a driveshaft for rotation and an outer bearing cap disposed proximal a drive end of the bracket. The bracket also includes an inner bearing cap and an insulation sleeve disposed within the bracket proximal the bearing. The outer bearing cap, the inner bearing cap and the insulation sleeve are configured as modular components.

BRIEF DESCRIPTION OF THE SEVERAL VIEWS OF THE DRAWING(S)

DETAILED DESCRIPTION OF THE INVENTION

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Figure 1:
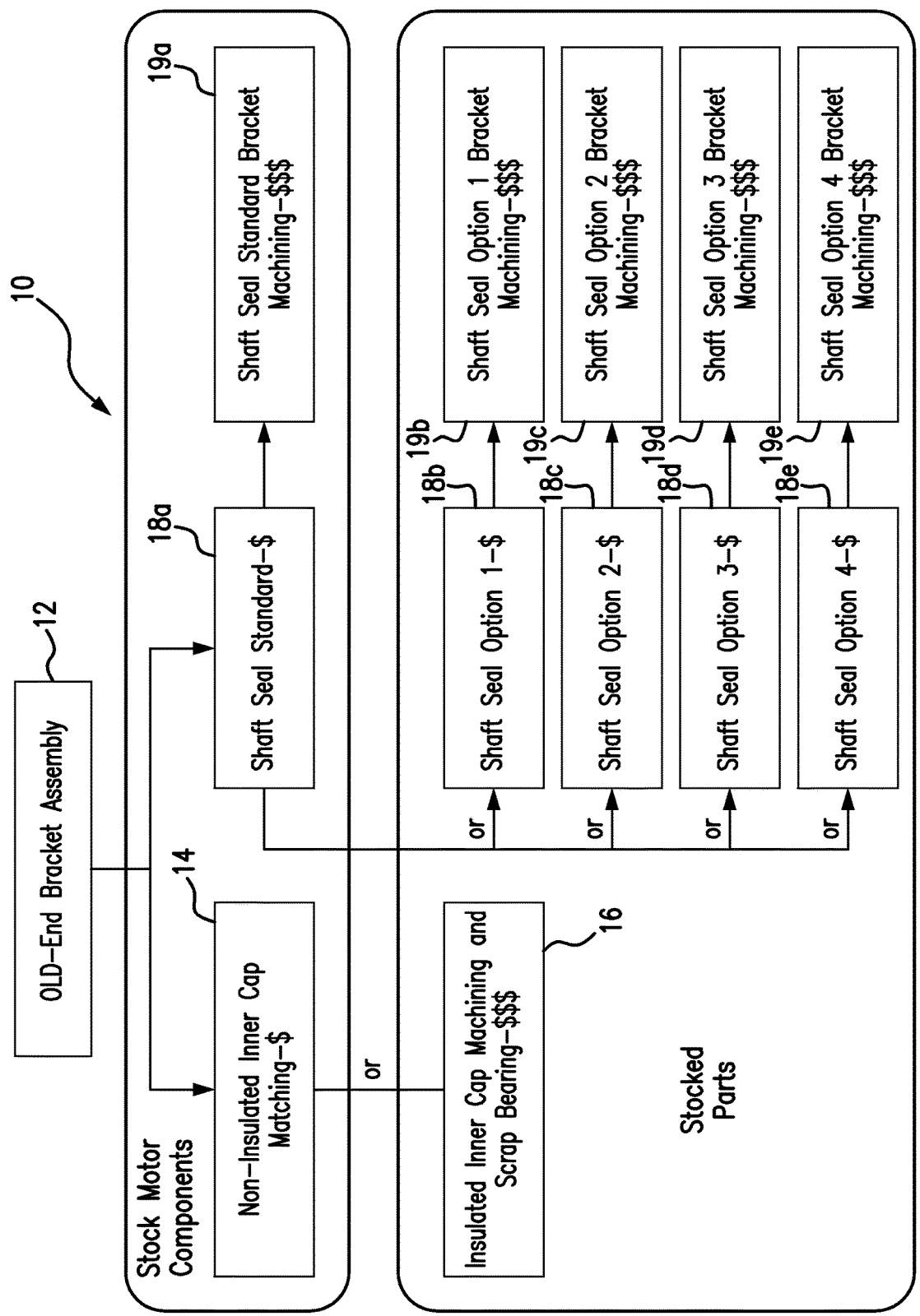
FIG. 1 is a flowchart illustrating a conventional end bracket bearing assembly.
Figure 2:
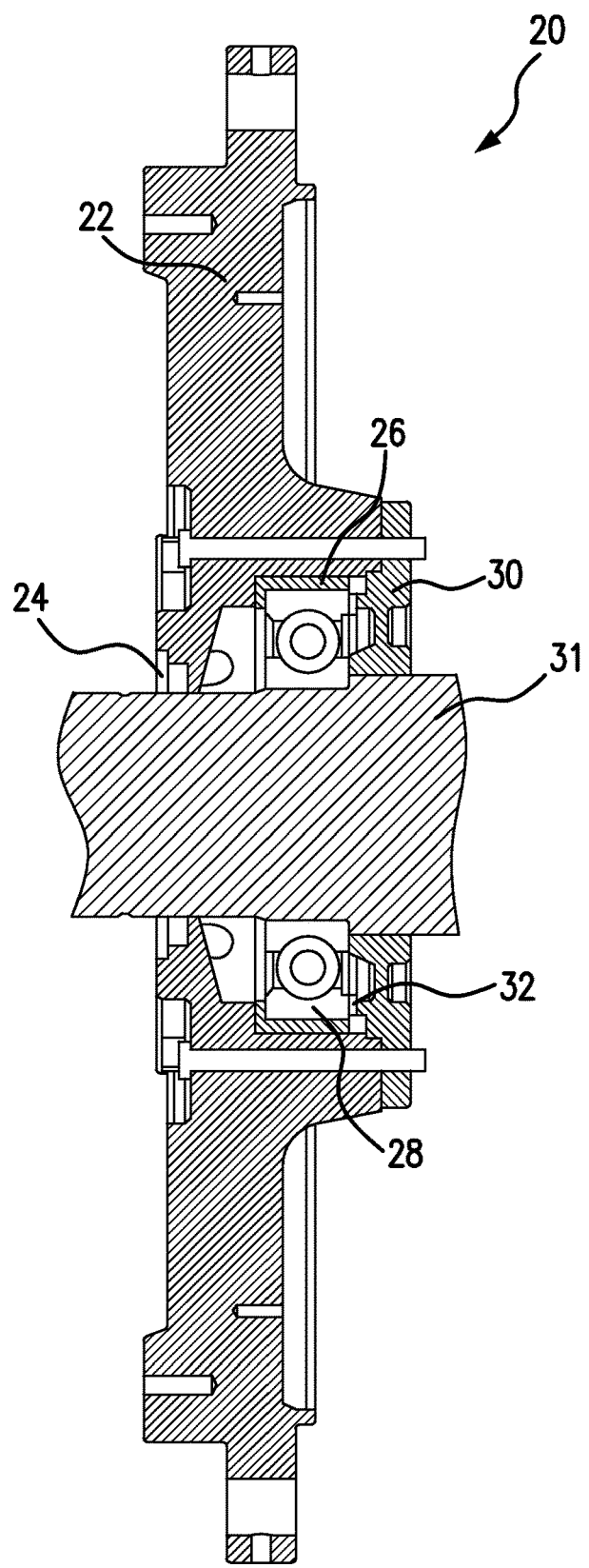
FIG. 2 is a diagrammatic cross-sectional view of a conventional bearing insulation system.
Figure 3:
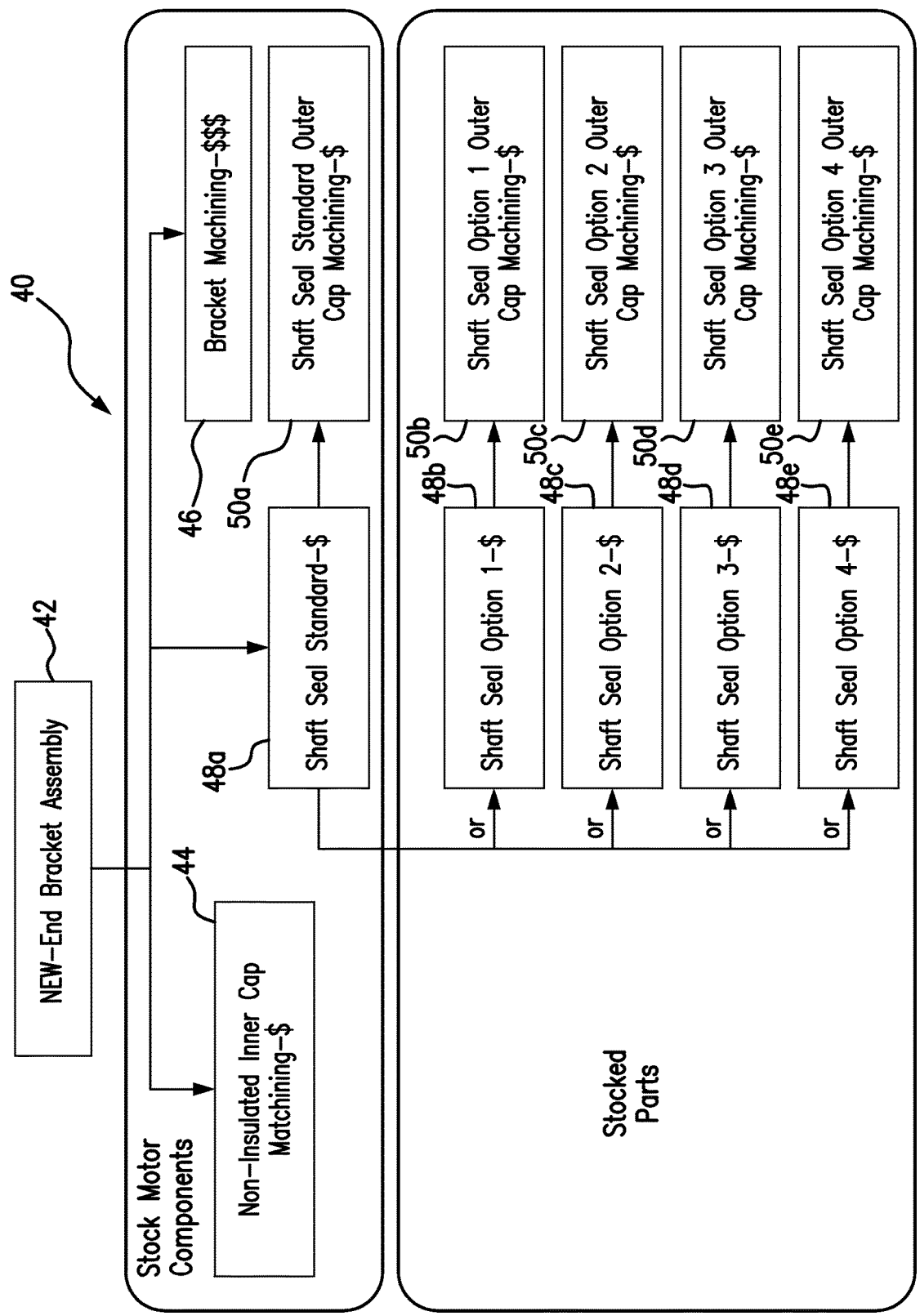
FIG. 3 is a flowchart illustrating an end bracket bearing assembly according to an embodiment.

Referring now to FIG. 3, there is a flowchart 40 illustrating an end bracket bearing assembly 42 which includes a non-insulated inner cap machining step 44 and a bracket machining step 46. These steps may lead to a shaft seal 48a step and a shaft seal outer cap 50a step. In certain embodiments, shaft seal 48a step, depending on a user's requirements for the end bracket, may include a plurality of shaft seal options (48b, 48c, 48d, 48e) corresponding to a matching plurality of shaft seal outer cap options (50b, 50c, 50d, 50e) which may each be machined, as needed.

Figure 4:
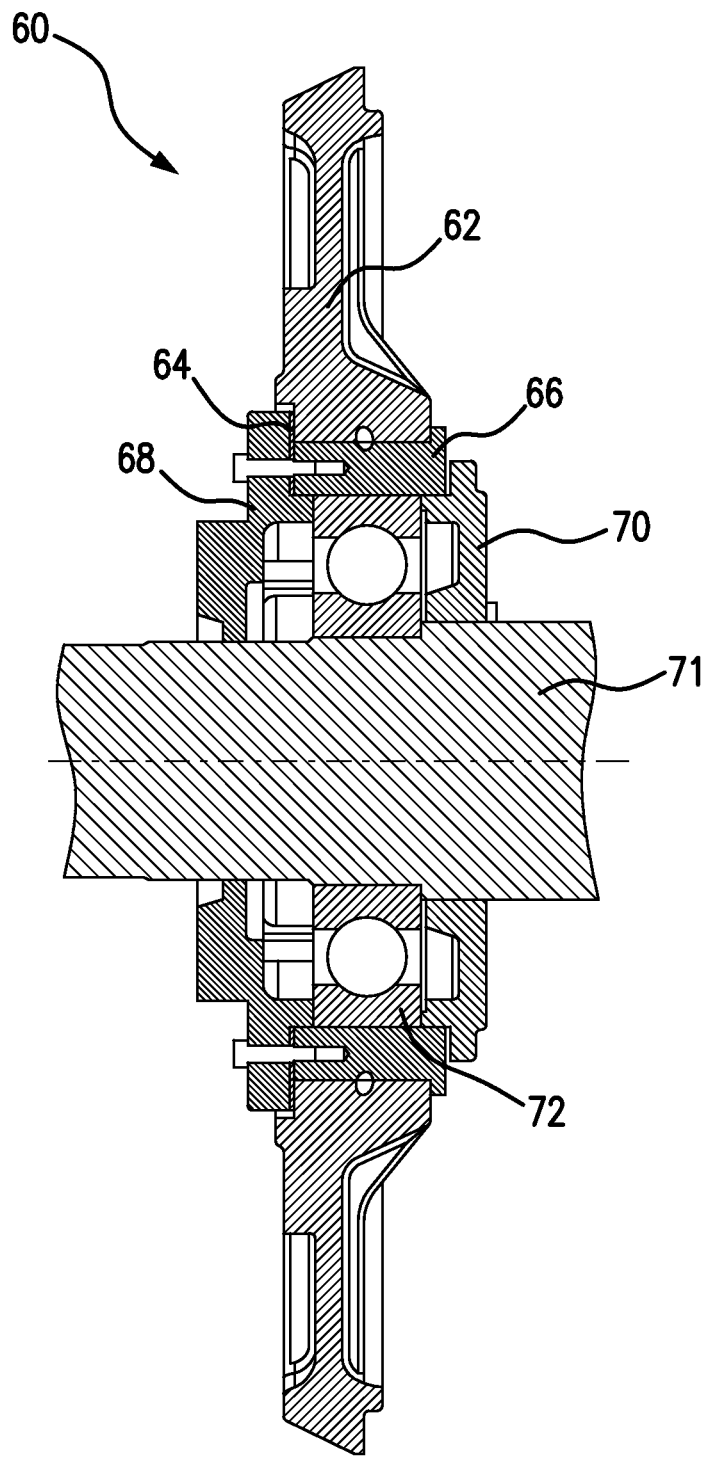
FIG. 4 is a diagrammatic cross-sectional view of bearing insulation system according to an embodiment.

Referring now to FIG. 4, there is a bearing insulation system 60 including a bracket 62, an insulated shim 64, an insulation sleeve 66, an outer bearing cap 68, an inner bearing cap 70, a driveshaft 71 and a bearing 72. In certain embodiments, shim 64 is disposed between the outer bearing cap 68 and the bracket 62. Also, sleeve 66 may be press fit into bracket 62. Inner bearing cap 70 may be utilized for either an insulated or non-insulated assembly. Bearing 72 may be a roller or ball type for example.

In certain embodiments, electric machine bracket assemblies are configured for modular configurations by having a minimum number of machined brackets/endplates 62, inner bearing caps 70 and outer bearing caps 68. The modular components have common outer and inner bearing caps 68, 70, respectively, that may be used across a multitude of configurations with a minimal number of parts to be machined. For example, a modular insulation sleeve 66 allows for the use of standard anti-friction rolling element bearings. Seal 78 such as provisions for slingers, lip seals and the like are provided through a change in the outer bearing cap 68 only as opposed to being combined in the bracket 62. Isolation of the bearing may be accomplished by using an insulation sleeve 66 that is retained in the bracket 62 via bolts 63. The insulation sleeve 66 may be sized such that the inner bearing cap 70 does not need to be isolated from the bracket 62.

In some embodiments, bracket 62 manufacture includes a cast or insulation sleeve 66 which is machined and wrapped in an insulating material which is then impregnated with a synthetic resin material. Insulation on the sleeve 66 is then machined to size and placed into a bore 81 of the bracket 62. The outer bearing cap 68 and inner bearing cap 70 are assembled on a motor as shown in FIG. 4. Note that outer bearing cap 68 is larger than sleeve 66, this is done to prevent axial movement of the sleeve due to possibility of impact to the driveshaft 71 on either end of motor (not shown). Alternative materials may be used to make the insulation sleeves 66. Any non-electrical conductive material that is dense enough to carry the weight and withstand the temperature may be used. Some polymer and ceramic material may be viable alternatives to a cast iron wrapped sleeve.

The bearing insulation system 60 may be utilized on a number of motors, such as, rib-cooled induction, modular induction, synchronous, variable speed, AboveNEMA, severe duty, and general purpose motors, or the like.

In some embodiments the bracket 62 utilizes one inner bearing cap 70 for insulated and non-insulated bearings 72. Fewer parts are stocked because of this. When the user modifies the stock motor to have an insulated drive end (DE) bearing, the bearing is not removed, and subsequently is not scrapped. Two bracket options exist, one non-insulated and one insulated. The stock motor comes with a non-insulated DE bracket; only one insulated bracket per bearing size is kept in stock to accommodate customer modifications. For the conventional system design, eight (8) total brackets are stocked.

In certain embodiments, the bracket 62 is no longer machined for various shaft seals. The bracket 62 has been configured to accommodate an outer bearing cap 68, which is machined to fit the seal 78. The outer bearing cap 68 is smaller, cheaper and easier to machine. When a user modifies a stock order and chooses an alternate shaft seal, only the outer bearing cap 68 is removed and replaced; the bracket 62 remains unchanged. At least four (4) outer caps have to be stocked, but they are smaller and cheaper than large brackets.

Figure 5A:
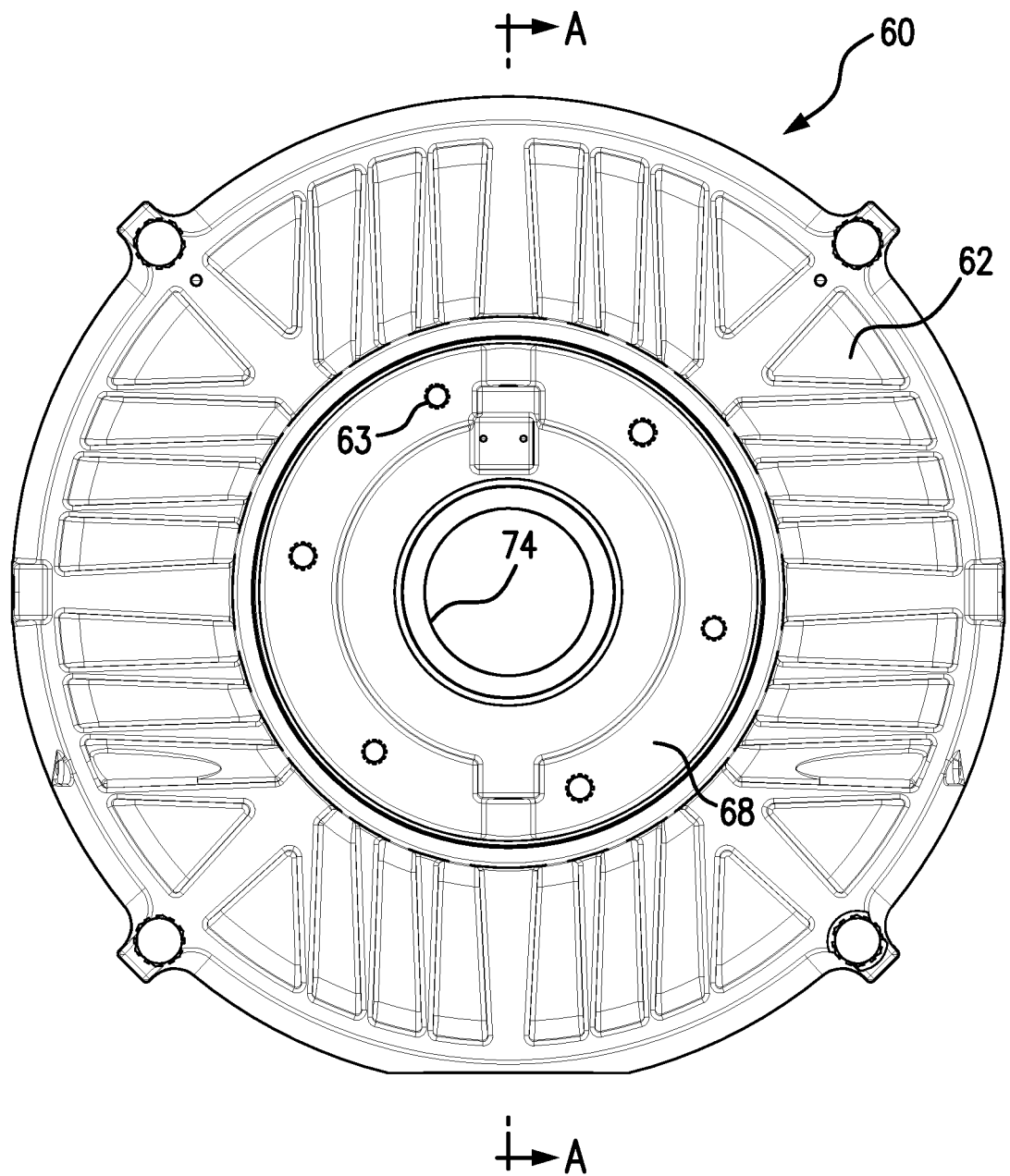
FIG. 5A is a schematic plan view illustrating a bearing insulation system (w/o sleeve) according to an embodiment.
Figure 5B:
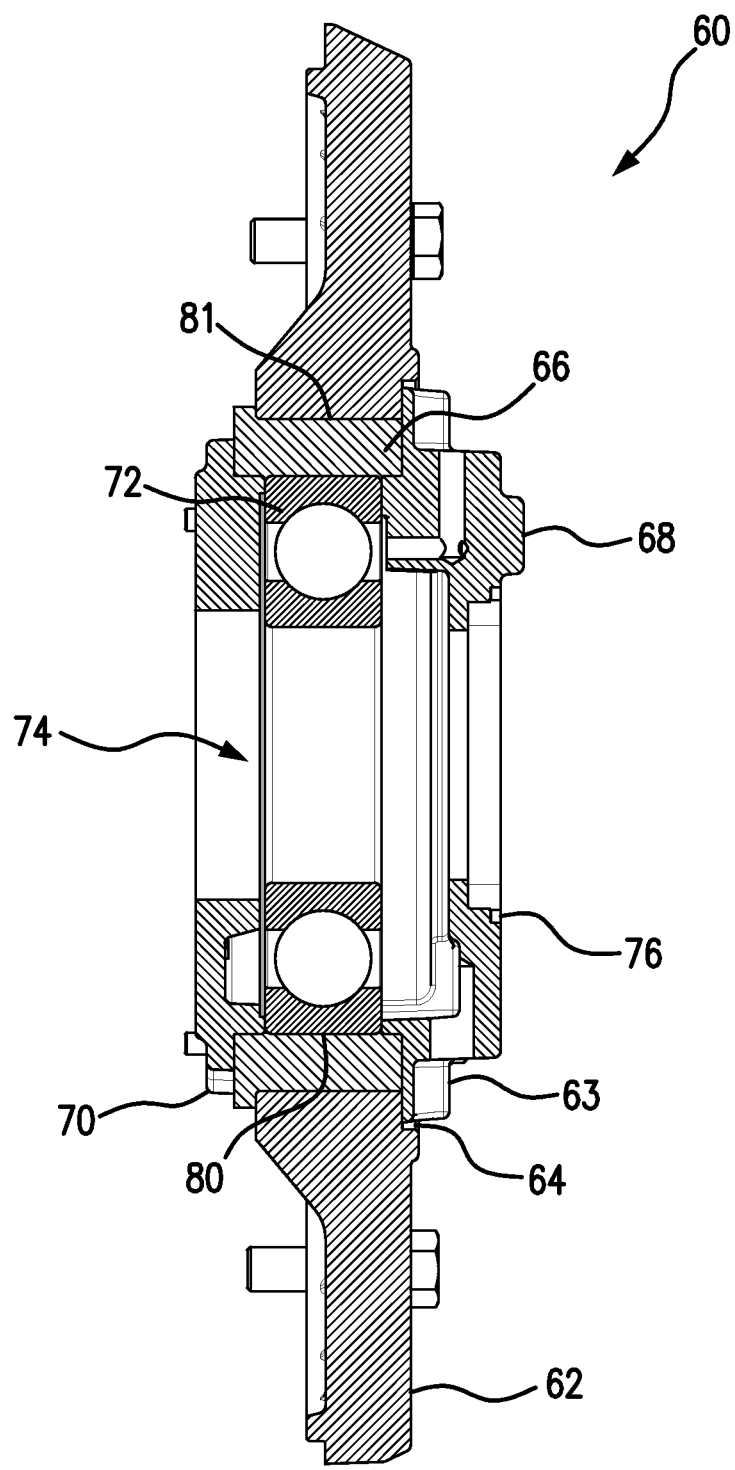
FIG. 5B is a schematic cross-sectional view taken along A-A of FIG. 5A.
Figure 5C:
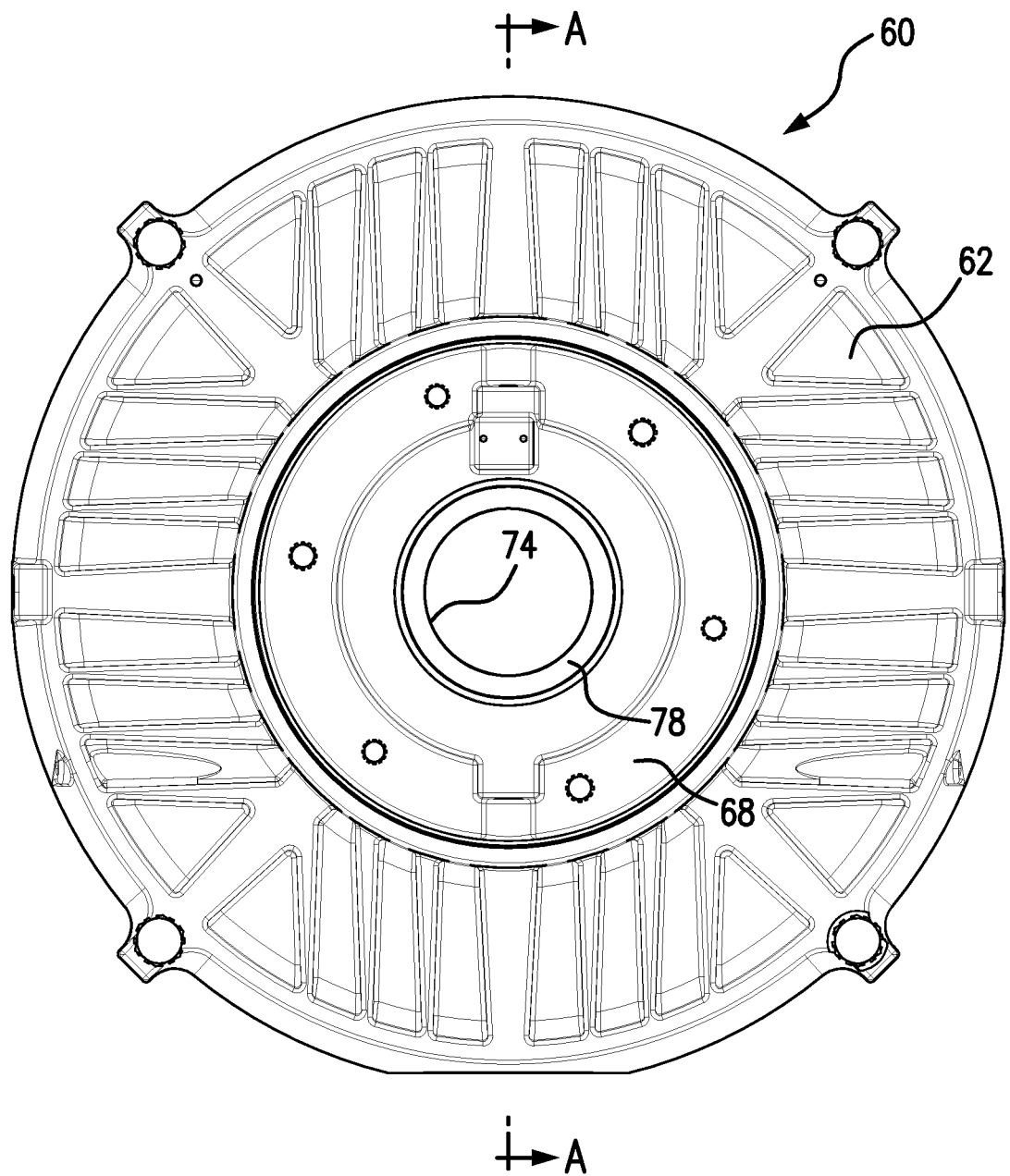
FIG. 5C is a schematic plan view illustrating a bearing insulation system (w/sleeve) according to an embodiment.

Referring now to FIGS. 5A to 5D, there is a bearing insulation system 60 including bracket 62 and outer bearing cap 68 mounted via bolts 63 to the bracket 62. In some embodiments, outer bearing cap 68 includes an opening 74 configured to pass-through driveshaft 71 when assembled. In FIG. 5B there is a cross-section of system 60 taken along A-A of FIG. 5A including bracket 62 having a bore 81 wherein insulation sleeve 66 may be press fit. Sleeve 66 includes a sleeve opening 80 wherein bearing 72 is disposed. In certain embodiments, outer bearing cap 68, inner bearing cap 70 and bearing 72 include co-axial openings at 74 in which driveshaft 71 rotates therein. In FIG. 5C, opening 74 further includes an opening lip 76 in which seal 78 may be disposed in a tight fit.

Figure 5D:
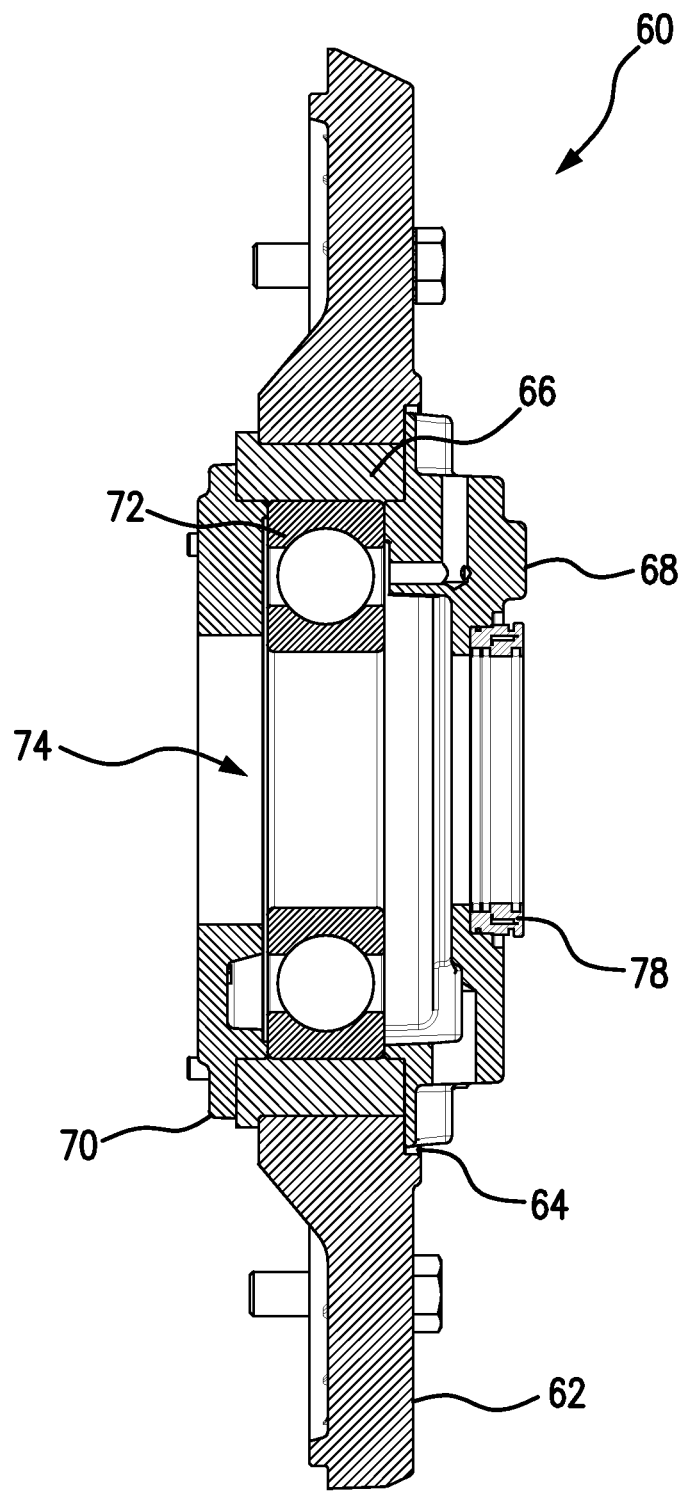
FIG. 5D is a schematic cross-sectional view taken along A-A of FIG. 5C.

FIG. 5D is a cross-sectional view of system 60 taken along A-A of FIG. 5C illustrating seal 78 disposed within lip 76.

Figure 6A:
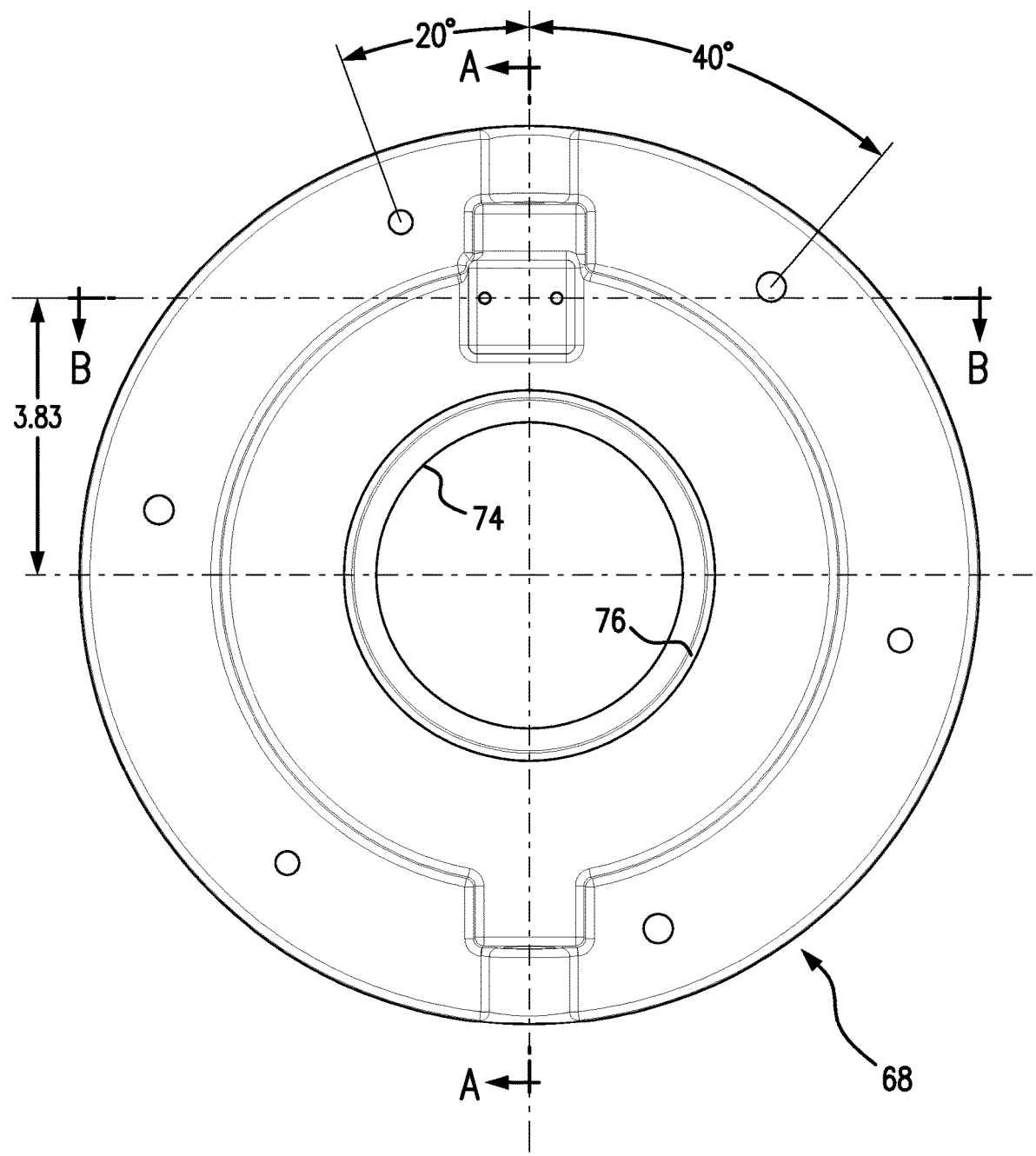
FIG. 6A is a schematic plan view of an outer bearing cap of a bearing insulation system according to an embodiment.

Referring now to FIG. 6A, there is an outer bearing cap 68 of a bearing insulation system 60 according to an embodiment. In some embodiments, outer bearing cap 68 includes opening 74 and lip 76 disposed about opening 74.

Figure 6B:
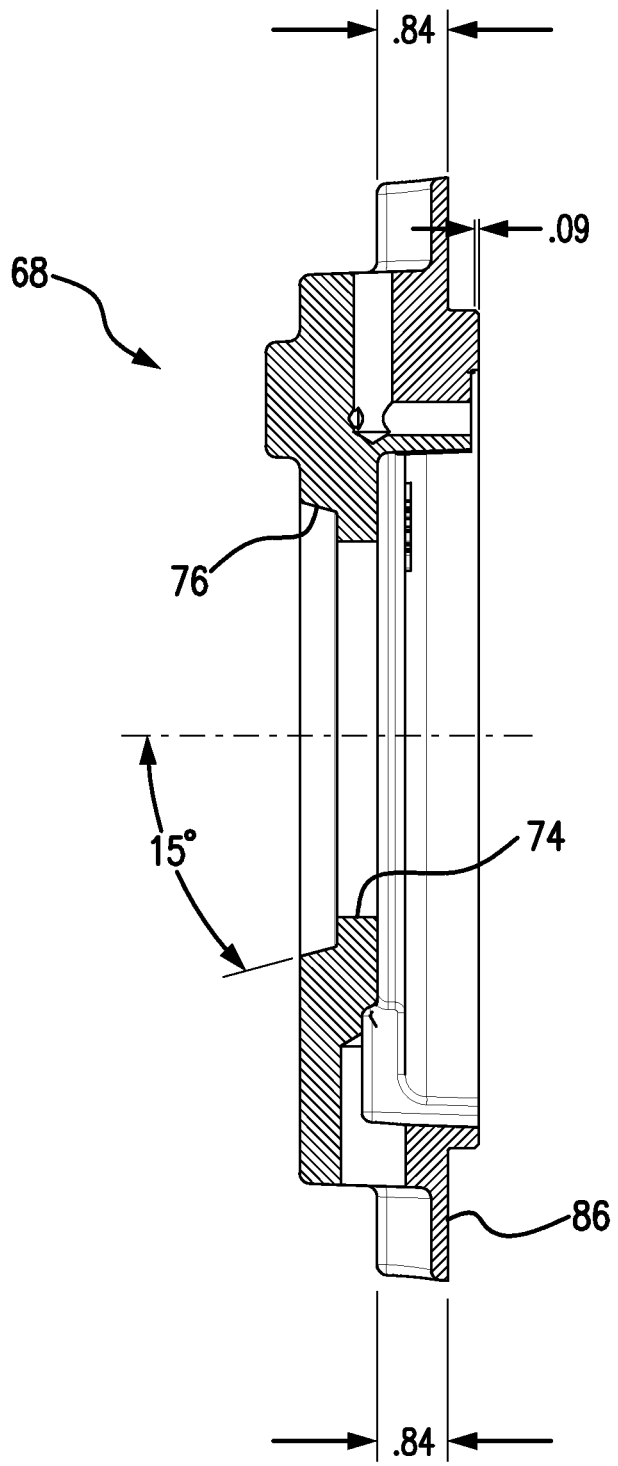
FIG. 6B is a schematic cross-sectional view taken along A-A of FIG. 6A.
Figure 6C:
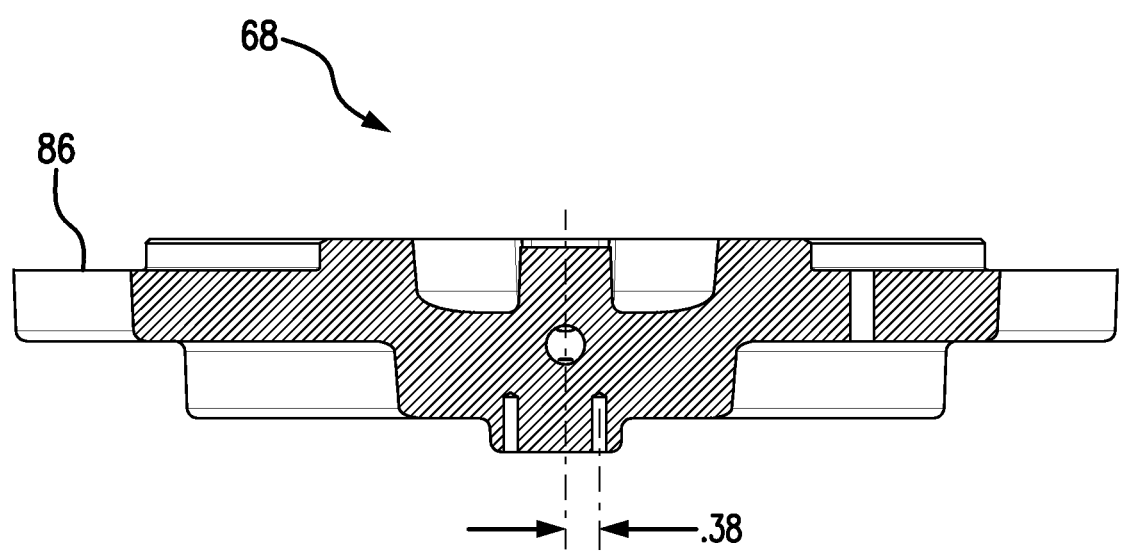
FIG. 6C is a schematic cross-sectional view taken along B-B of FIG. 6A.

In FIG. 6B there is a cross-sectional view of outer bearing cap 68 taken along A-A of FIG. 6A. In FIG. 6C there is a cross-sectional view of outer bearing cap 68 taken along B-B of FIG. 6A showing machined features of outer bearing cap 68.

Figure 7A:
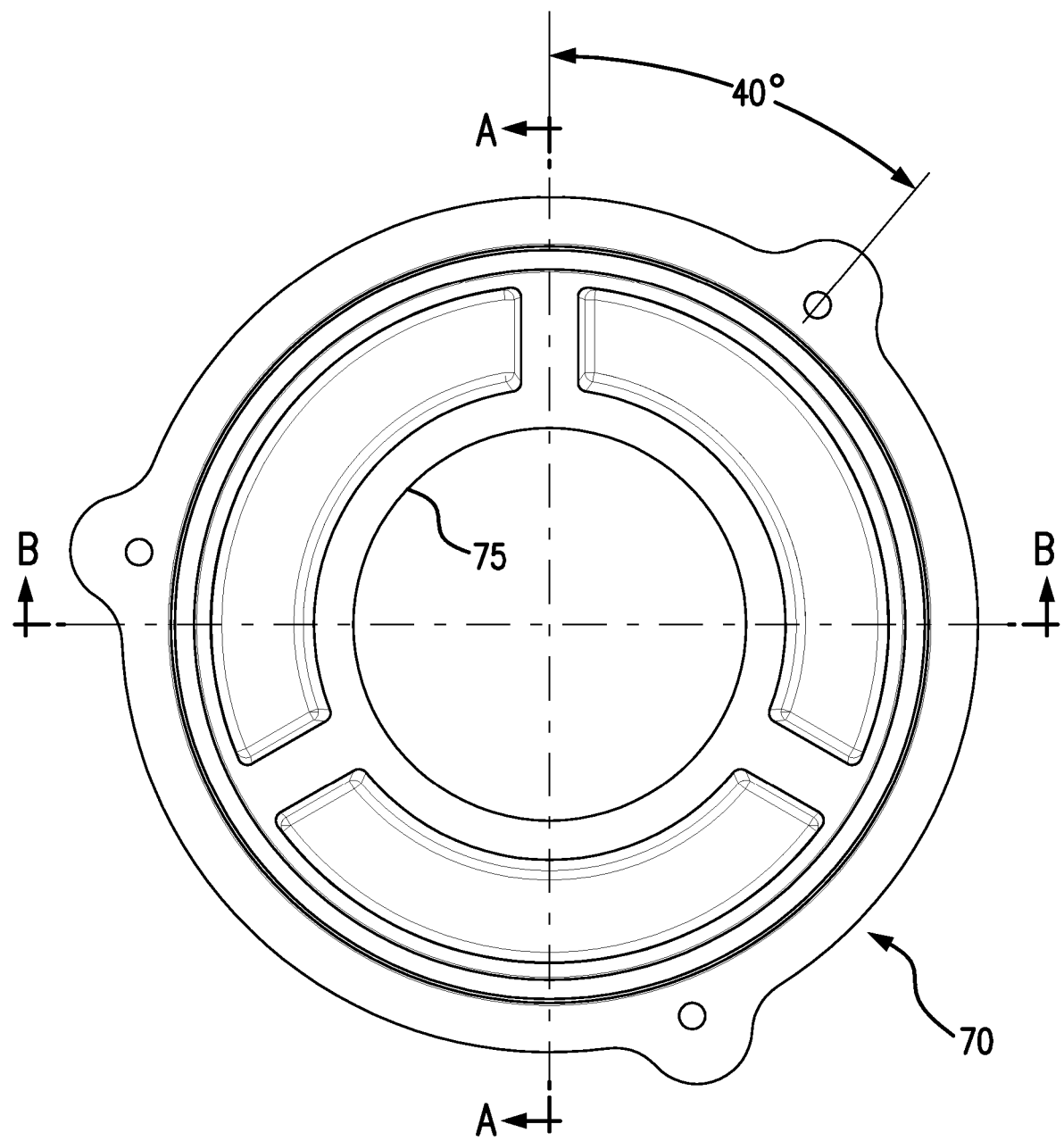
FIG. 7A is a schematic plan view of an inner bearing cap of a bearing insulation system according to an embodiment.
Figure 7B:
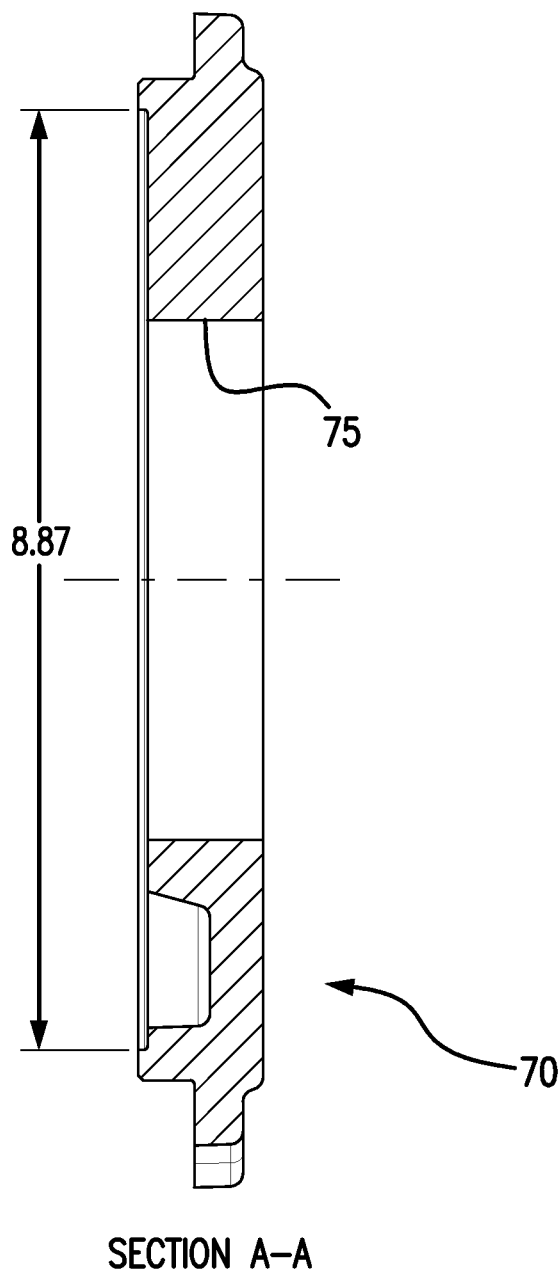
FIG. 7B is a schematic cross-sectional view taken alone A-A of FIG. 7A.
Figure 7C:
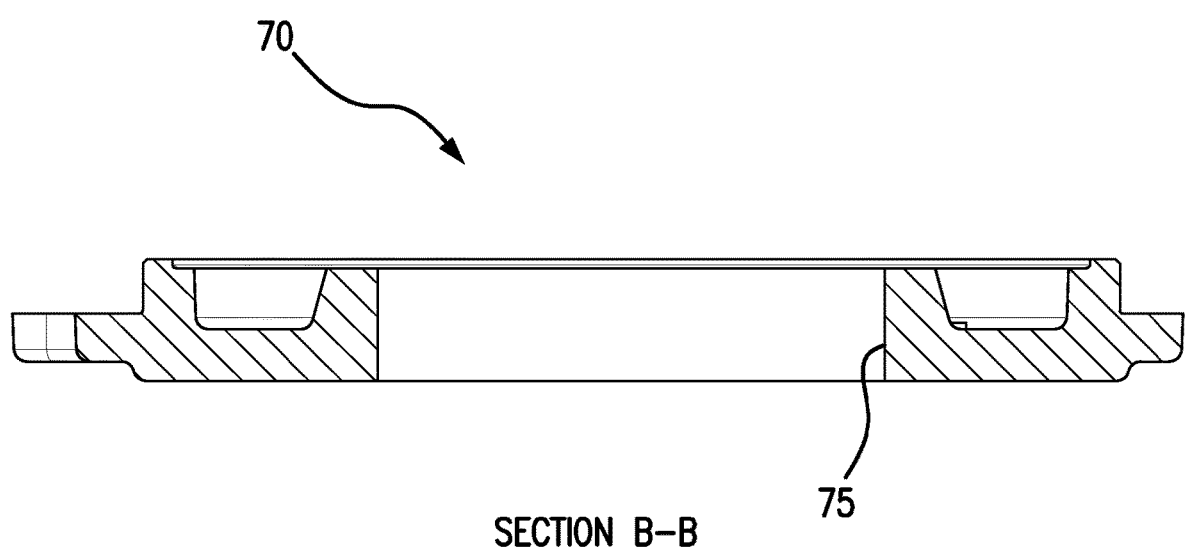
FIG. 7C is a schematic cross-sectional view taken alone B-B of FIG. 7A.

Referring now to FIG. 7A, there is an inner bearing cap 70 of a bearing insulation system 60 according to an embodiment. In certain embodiments, inner bearing cap 70 includes an opening 75 which corresponds to opening 74 upon assembly of system 60. In FIG. 7B there is a cross-sectional view of inner bearing cap 70 taken alone A-A of FIG. 7A showing opening 75. In FIG. 7C there is a cross-sectional view of inner bearing cap 70 taken alone B-B of FIG. 7A.

Figure 8A:
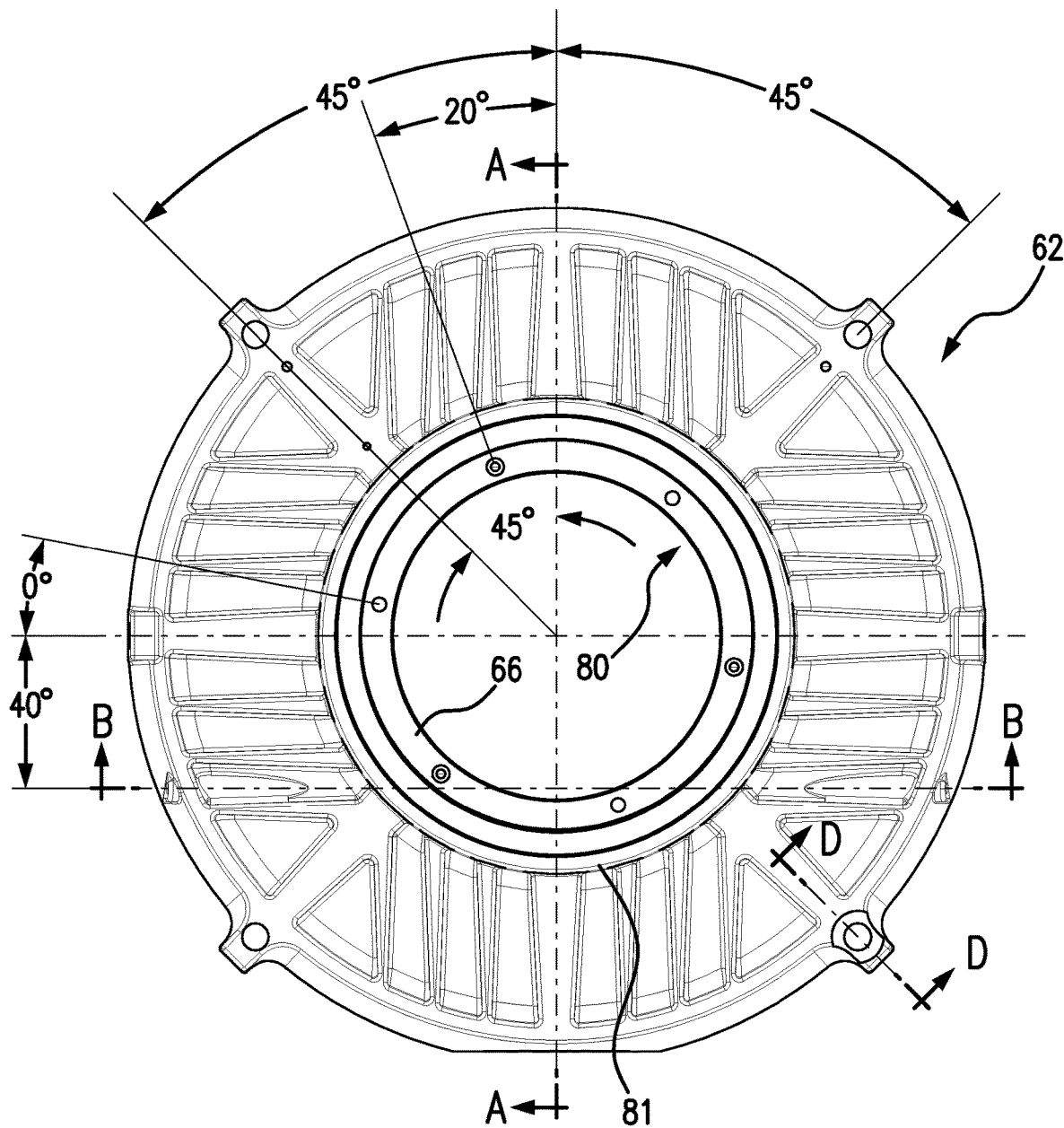
FIG. 8A is a schematic plan view of a bracket of a bearing insulation system according to an embodiment.
Figure 8B:
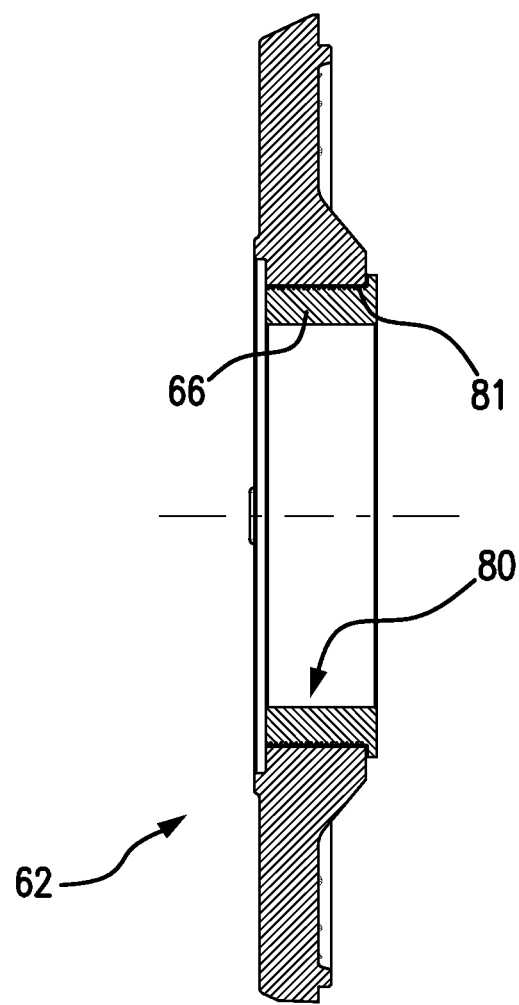
FIG. 8B is a schematic cross-sectional view taken alone A-A of FIG. 8A.
Figure 8C:
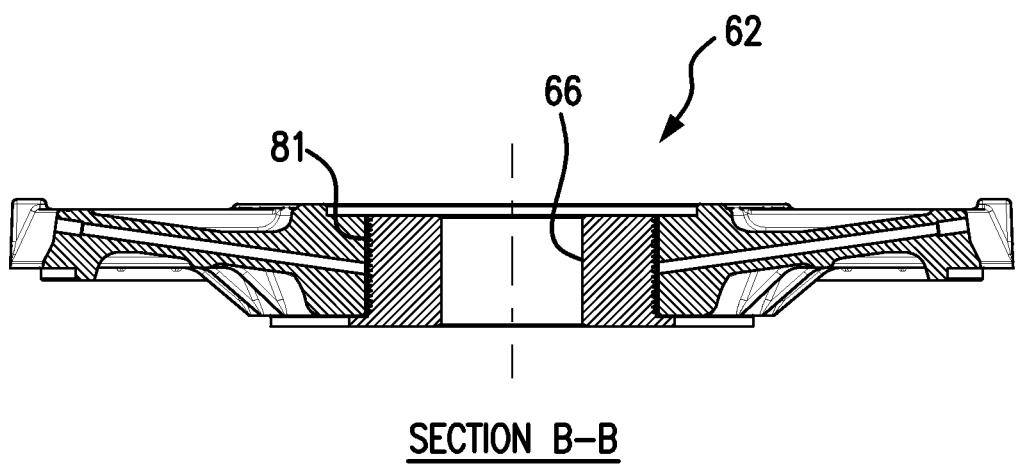
FIG. 8C is a schematic cross-sectional view taken alone B-B of FIG. 8A.
Figure 8D:
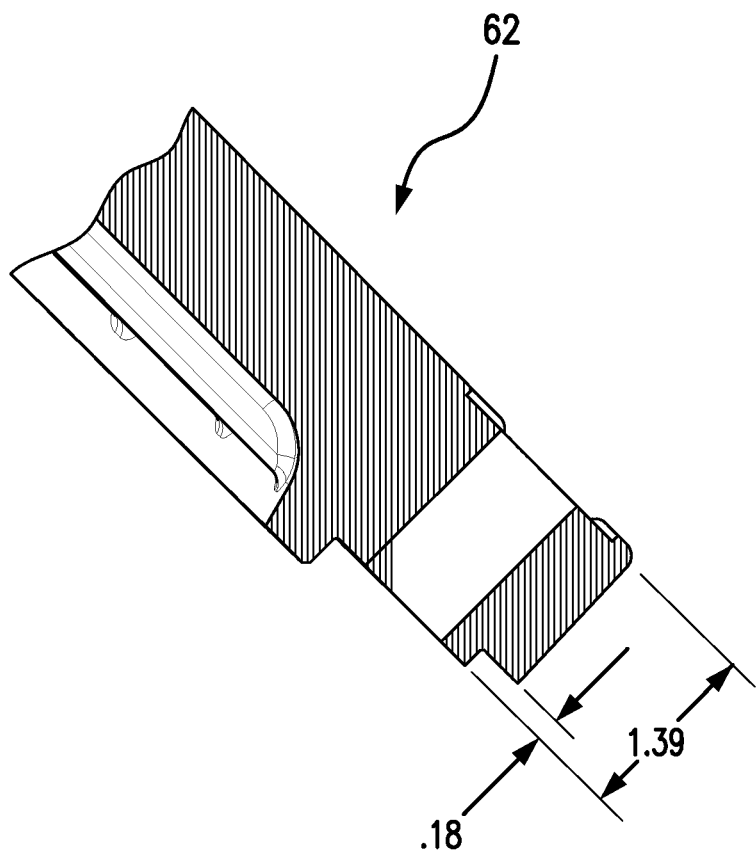
FIG. 8D is a schematic cross-sectional view taken alone D-D of FIG. 7A.
Figure 8E:
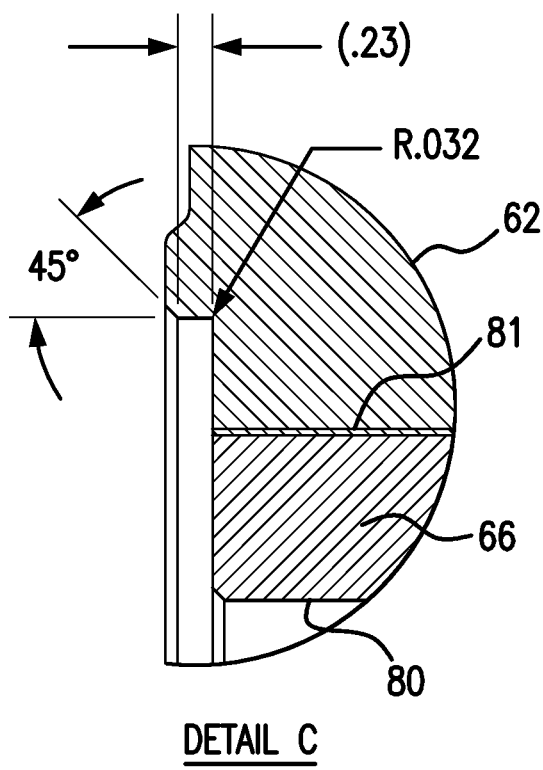
FIG. 8E is a schematic detailed view taken at C of FIG. 7A.

Referring now to FIG. 8A, there is a bracket 62 of a bearing insulation system 60 including the insulation sleeve 66 disposed within bracket bore 81 via a press fit or the like. Sleeve 66 includes sleeve opening 80 configured to fit bearing 72 therein. In FIG. 8B there is a cross-sectional view of bracket 62 taken alone A-A of FIG. 8A showing sleeve opening 80 and insulation sleeve 66 disposed within bore 81 of bracket 62. In FIG. 8C there is a cross-sectional view of bracket 62 taken alone B-B of FIG. 8A illustrating a top portion of sleeve 66 disposed in bore 81. In FIG. 8D is a cross-sectional view of bracket 62 taken alone D-D of FIG. 7A shows a connector bore configured to bolt bracket 62 to a motor (not shown). In FIG. 8E there is a detailed view of the press fit contact between bracket 62 and insulation sleeve 66 taken at C of FIG. 7A.

Figure 9A:
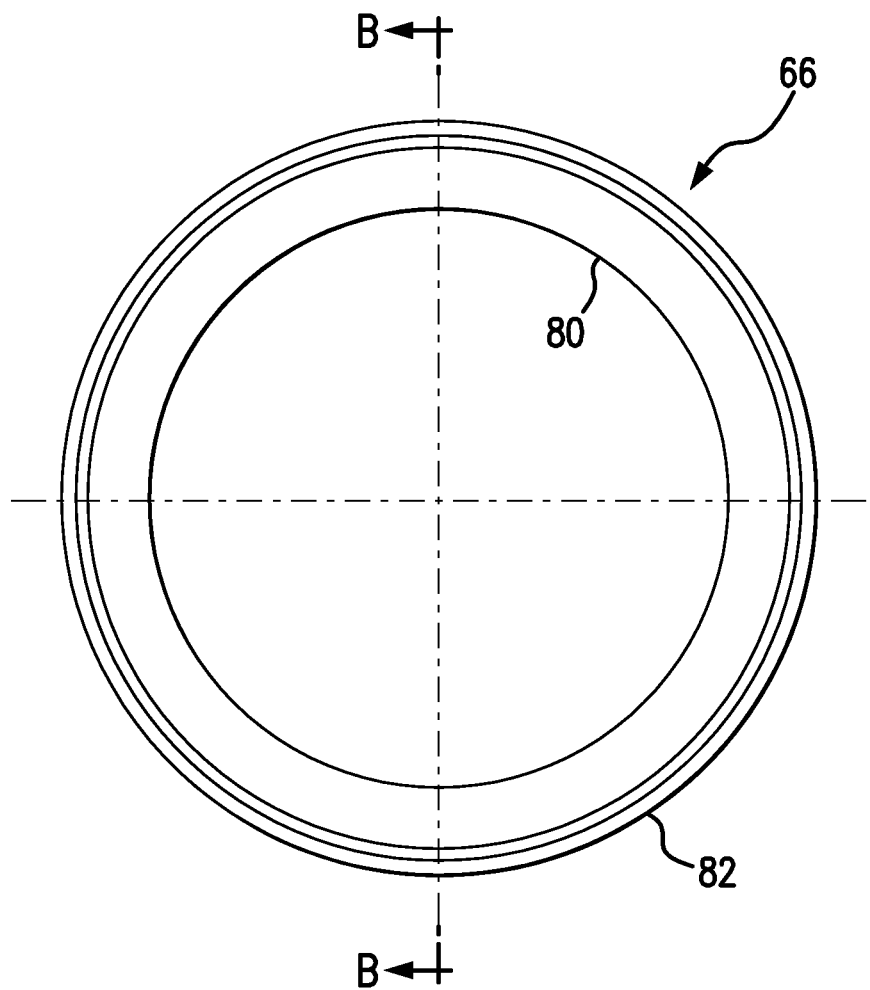
FIG. 9A is a schematic plan view of an insulation sleeve of a bearing insulation system according to an embodiment.
Figure 9B:
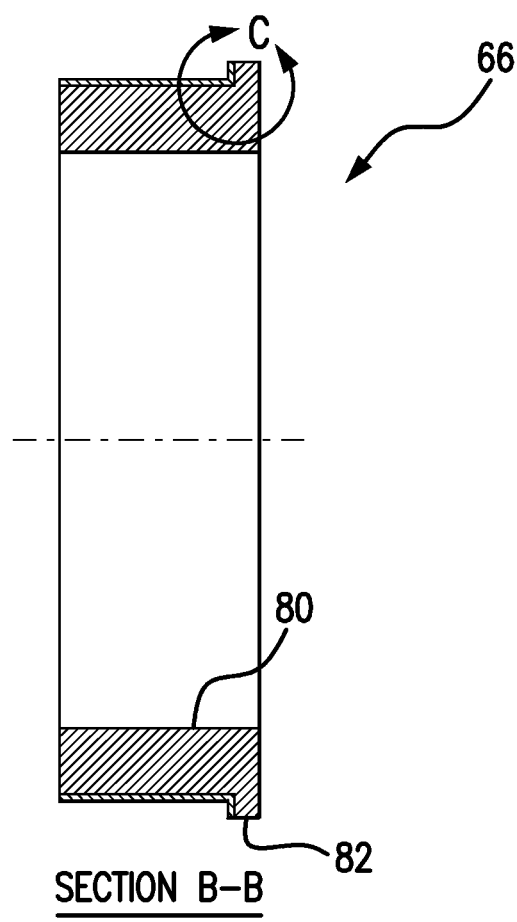
FIG. 9B is a schematic cross-sectional view taken along B-B of FIG. 9A.
Figure 9C:
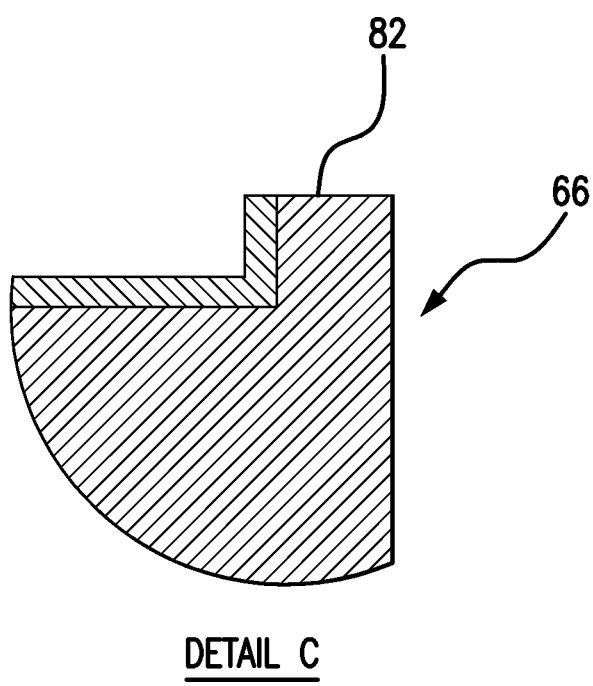
FIG. 9C is a schematic detailed view taken at C of FIG. 9B.

Referring now to FIGS. 9A and 9B, there is an insulation sleeve 66 of a bearing insulation system 60 according to an embodiment. Insulation sleeve 66 includes a sleeve lip 82 and a sleeve opening 80. Sleeve 66 as discussed above may be press fit into bore 81 of bracket 62 upon assembly. In FIG. 9B there is a cross-sectional view of sleeve 66 taken along B-B of FIG. 9A. In FIG. 9C there is a detailed view of the sleeve lip 82 taken at C of FIG. 9B. In some embodiments, lip 82 abuts a surface of bracket 62 proximal inner bearing cap 70 upon assembly of system 60. As discussed above, in certain embodiments, insulation sleeve 66 may be machined and wrapped in an insulating material which may then be impregnated with a synthetic resin material. Insulation on the sleeve 66 is then machined to size and placed into a bore 81 of the bracket 62

Figure 10:
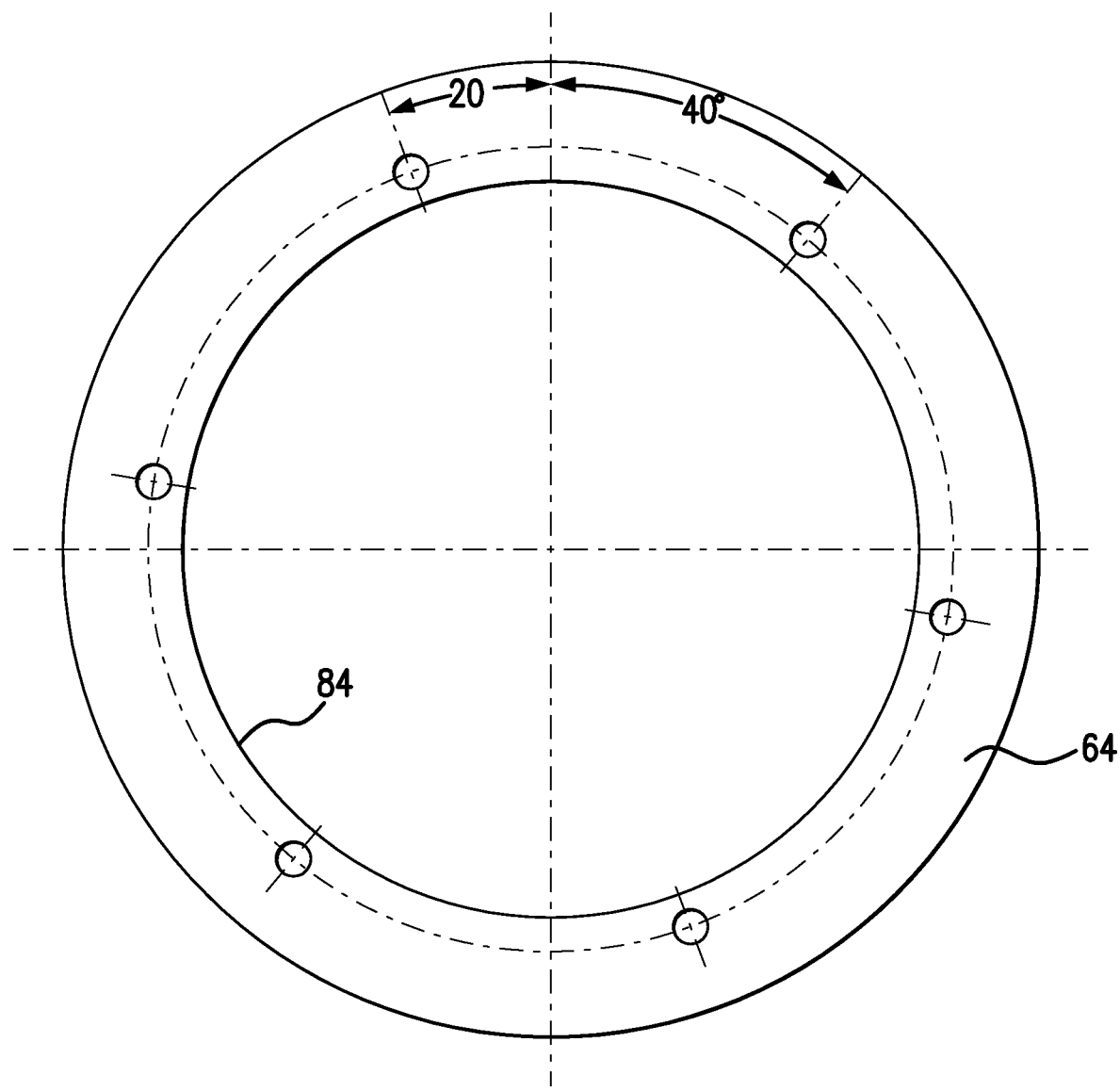
FIG. 10 is a schematic plan view of an outer cap insulation shim of a bearing insulation system according to an embodiment.

Referring now to FIG. 10, there is an outer cap insulation shim 64 of a bearing insulation system 60 according to an embodiment. Shim 64 may be disposed between the outer bearing cap 68 and the bracket 62 for electrical isolation purposes. Shim 64 may include a shim opening 84 configured to fit about the outer ring 86 of outer bearing cap 68 with shim 64 sandwiched between bracket 62 and outer bearing cap 68 upon assembly.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. Thus, it will be appreciated that the scope of the present invention is not limited to the above described embodiments, but rather is defined by the appended claims; and that these claims will encompass modifications of and improvements to what has been described.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An anti-friction insulated bearing system, comprising:
   a bracket disposed about a motor driveshaft;
   a bearing disposed within the bracket configured to support the driveshaft for rotation;
   an outer bearing cap disposed proximal a drive end of the bracket;
   an inner bearing cap; and
   an insulation sleeve disposed within the bracket proximal the bearing,
   wherein the outer bearing cap, the inner bearing cap and the insulation sleeve are configured as modular components of the system.

2. The anti-friction insulated bearing system of claim 1, wherein the inner bearing cap is non-insulated.

3. The anti-friction insulated bearing system of claim 1, further comprising an insulated shim disposed between the outer bearing cap and the bracket.

4. The anti-friction insulated bearing system of claim 1, wherein the insulation sleeve is press fit into the bracket.

5. The anti-friction insulated bearing system of claim 1, wherein the bracket includes a bracket bore disposed along a central axis.

6. The anti-friction insulated bearing system of claim 1, further comprising a seal disposed in the outer bearing cap, wherein the seal is configured to encircle the motor driveshaft.

7. The anti-friction insulated bearing system of claim 1, wherein the insulation sleeve includes a sleeve lip extending radially about a circumference of the insulation sleeve.

8. The anti-friction insulated bearing system of claim 7, wherein the sleeve lip abuts an outer surface of the bracket.

9. The anti-friction insulated bearing system of claim 7, wherein the outer bearing cap is circumferentially larger than the circumference of the insulation sleeve.

10. The anti-friction insulated bearing system of claim 1, wherein the inner bearing cap and the outer bearing cap are configured to be removably bolted to the bracket.

11. The anti-friction insulated bearing system of claim 1, wherein the bearing is one of a roller bearing or a ball bearing.

12. The anti-friction insulated bearing system of claim 1, wherein the insulation sleeve is impregnated with a synthetic resin as insulation.

13. The anti-friction insulated bearing system of claim 1, wherein the insulation sleeve includes a non-electrical conductive polymer.

14. An anti-friction insulated bearing system, comprising:
   a bracket disposed about a motor driveshaft;
   a bearing disposed within the bracket configured to support the driveshaft for rotation;
   an outer bearing cap disposed proximal a drive end of the bracket;
   an inner bearing cap; and an insulation sleeve disposed within the bracket proximal the bearing, wherein the outer bearing cap, the inner bearing cap and the insulation sleeve are configured as modular components of the system; and wherein the inner bearing cap and the outer bearing cap are arranged and configured to matingly engage with a plurality of different types of insulation sleeves when any one of the plurality of different types of insulation sleeves is installed in the anti-friction insulated bearing system to replace the insulation sleeve.

15. A motor bracket, comprising:

a bearing disposed within the bracket configured to support a driveshaft for rotation;

an outer bearing cap disposed proximal a drive end of the bracket;

an inner bearing cap; and an insulation sleeve disposed within the bracket proximal the bearing, wherein the outer bearing cap, the inner bearing cap and the insulation sleeve are configured as modular components.

16. The motor bracket of claim 15, wherein the inner bearing cap and the outer bearing cap are arranged and configured to matingly engage with a plurality of different types of insulation sleeves when any one of the plurality of different types of insulation sleeves is installed in the motor bracket to replace the insulation sleeve.

17. The motor bracket of claim 15, wherein the insulation sleeve includes a non-electrical conductive polymer.

18. The motor bracket of claim 15, wherein the outer bearing cap is circumferentially larger than the circumference of the insulation sleeve.

* * * * *